(12) United States Patent
Reininger

(10) Patent No.: US 7,587,109 B1
(45) Date of Patent: Sep. 8, 2009

(54) HYBRID FIBER COUPLED ARTIFICIAL COMPOUND EYE

(75) Inventor: Francis Mark Reininger, Tujunga, CA (US)

(73) Assignee: Spectral Imaging Laboratory, Pasadena, CA (US)

( * ) Notice: Subject to any disclaimer, the term of this patent is extended or adjusted under 35 U.S.C. 154(b) by 0 days.

(21) Appl. No.: 12/202,738

(22) Filed: Sep. 2, 2008

(51) Int. Cl.
*G02B 6/26* (2006.01)

(52) U.S. Cl. .......................... 385/116; 385/27; 385/33; 385/39; 385/43; 385/50; 385/51; 385/52; 385/119; 385/147

(58) Field of Classification Search ................. 385/27, 385/33, 39, 43, 50–52, 115–116, 119, 147
See application file for complete search history.

(56) References Cited

U.S. PATENT DOCUMENTS

| | | | |
|---|---|---|---|
| 4,357,088 A | 11/1982 | Pomerantzeff | |
| 4,437,735 A | 3/1984 | Momiyama | |
| 6,449,103 B1 | 9/2002 | Charles | |
| 6,571,043 B1 | 5/2003 | Lowry | |
| 6,898,015 B2 | 5/2005 | Yoshikawa | |
| 6,933,167 B2 | 8/2005 | Yamamoto | |
| 6,942,959 B2 | 9/2005 | Dubin | |
| 6,967,779 B2 | 11/2005 | Fadel | |
| 7,106,529 B2 | 9/2006 | Gurevich et al. | |
| 7,119,962 B2 | 10/2006 | Kerr | |
| 7,184,090 B2 | 2/2007 | Watanabe | |
| 7,187,502 B2 | 3/2007 | Gurevich | |
| 7,217,573 B1 | 5/2007 | Oshida | |
| 7,286,295 B1 | 10/2007 | Sweatt | |
| 7,376,314 B2 * | 5/2008 | Reininger | ............... 385/116 |

OTHER PUBLICATIONS

Smith, "Modern Optical Engineering", McGraw-Hill, 1990.
Land and Nilsson, "Animal Eyes", Oxford University Press, England 2002.
Duparré et al., "Artificial Apposition Compound Eyes Fabricated by Micro-Optics Technology", Applied Optics, Aug. 2004, pp. 4303-4310, vol. 43, No. 22.
Lee and Szema, "Inspirations from Biological Optics for Advanced Photonic Systems", Science, Nov. 2005, pp. 1148-1150, vol. 310, No. 5751.
Ohara, "Glass Gatalog Data", Ohara Corporation, Oct. 2007.

* cited by examiner

*Primary Examiner*—Frank G Font
*Assistant Examiner*—Michael P Mooney

(57) ABSTRACT

A hybrid, wide angle imaging system combines high sensitivity superposition arrays with a high resolution apposition array to generate distortion free images with an infinite depth of field. A conformal, superposition array of Keplerian telescope objectives focuses multiple apertures of light through the tubes of a louver baffle. The baffle tubes are terminated by field stops that separate the focused light into inverted, intermediate sub-images. A superposition array of field lenses, positioned immediately after the field stops, reverses the angles of the light beams. An apposition array of erector lenses, linked optically to the superposition arrays and field stops, refocuses and adjoins the beams into a single, upright image. The upright image is formed on the convex surface of a fiber optic imaging taper, which transfers the image to the flat bottom of the taper where it can be viewed through an eyepiece or digitized by a detector array.

20 Claims, 8 Drawing Sheets

FIGURE 6a

| Optical Prescription for Hybrid Superposition-Apposition Array Imaging System ||||||||
|---|---|---|---|---|---|---|---|
| Part Reference: | 71 || 72 || 73 || 74 |
| Part Specification: | L-BAL35 || L-LAH53 || L-NBH54 || L-LAM72 |
| Part Reference: | 75 | 76 | 77 | 78 | 79 | 80 | 81 | 82 |
| Part Specification: | 46 mm | 41.2 mm | 38.4 mm | 30.8 mm | 29.8 mm | 25.4 mm | 21.7 mm | 16 mm |
| Part Reference: | 85 | 86 | 87 | 88 | 89 | 38 | 90 | 91 |
| Part Specification: | 5 deg | 4.8 mm | 2.8 mm | 4.4 mm | 3.7 mm | 4 mm | 2.9 mm | 1.535 mm |
| Part Reference: | 92 | 93 | 94 | 95 | 96 | 97 | 98 | 99 |
| Part Specification: | 2.2 mm | 1.1 mm | 1.9 mm | 4.8 mm | -3.22 mm | 2.7 mm | 0.66 mm | -1.8 mm |

HYBRID FIBER COUPLED ARTIFICIAL COMPOUND EYE

FIELD OF THE INVENTION

The present invention relates to wide angle imaging systems and, more particularly, to high resolution multiple aperture wide angle imaging systems with curved lenslet arrays that can be shaped to conform to a particular surface geometry.

BACKGROUND OF THE INVENTION

Conventional camera optics are derived from the eyes of vertebrates, wherein a single lens system captures light through a large aperture and focuses it onto a concave retina. Single aperture optics have the advantage of good spatial resolution and efficient light capture, but they are disadvantaged by their relatively large size and limited field of view. Vertebrates evolved to overcome the field of view limitation by gimbaling the eye in its socket, and by restricting the high resolution capability to the fovea centralis. Camera developers have attempted to extend the high resolution capability beyond the fovea by introducing additional optical elements to reduce the distortion that results from focusing an inherently concave image onto a flat film surface. The additional optical elements yield a lens that is expensive, heavy, and long. An example of a high resolution, wide angle lens is described by Momiyama in U.S. Pat. No. 4,437,735. The lens extends 20 inches beyond the image plane and uses 13 powered optical elements of different sizes, shapes, and materials.

Another disadvantage of the high resolution, single aperture lens is its need for focus adjustment to image objects at different distances. The problem is especially acute at close range and has prompted inventors to adopt various schemes to automate the focus adjustment process. One example of an auto focus system is described by Watanabe et al. in U.S. Pat. No. 7,184,090. It engages in a focusing operation while sending out an image capturing signal. It then settlers on the focus position that achieves the highest value in image contrast. As with all such auto focusing schemes, it cannot overcome the inherent design limitation of a single aperture lens: objects at different depths of field cannot be brought into focus simultaneously.

There is the need in many autonomous surveillance and robotic navigation applications for a distortion free, wide angle imaging system that remains in focus through all depths of field. Such a system could be modeled after the most popular eyes found in nature, the multiple aperture compound eyes of arthropods (i.e. insects and crustaceans). Compound eyes are formed from a convex array of micro-lenses (or lenslets) that collectively capture light through a very large field angle. The inherent advantage is that each sector of the field is separated into tiny zones that are imaged independently through lenslets positioned in the direction of the incoming image light. Since the aperture diameter and field angle of each lenslet are small, the corresponding optical aberrations are small. The composite image generated by the array is distortion free and remains in focus at all depths of field because each lenslet captures a very small section of the optical wavefront emanating from the object. The smaller the wavefront sections, the flatter they become until all objects appear to be at infinity. This is why arthropods have no need for a focusing mechanism.

Natural compound eyes can be divided into two general categories: apposition and superposition. In the apposition eye a simple lenslet focuses light directly onto a nearby receptive rod called a rhabdom. The two components constitute an ommatidium, of which there are thousands. Only a small cone of light along the axis of each ommatidium is detected. Light entering from outside the cone angle is absorbed in surrounding pigment cells. The spherical layout of the array enables adjoining lenslets to view adjacent fields. Though each lenslet image is inverted, in mosaic form the composite image appears erect because the lenslet viewing sectors are so small.

The architecture of the superposition eye varies slightly from that of the apposition eye. The superposition eye includes a meniscus shaped shell of long crystalline cones, a clear zone, and a convex rhabdom layer separated from the cones by a distance equal to half the radius of curvature of the outer meniscus surface. The cornea of each crystalline cone focuses incoming light within the cone and then collimates it in the latter part of the cone. The cone therefore acts as both a Keplerian telescope objective and an afocal eyepiece. Since the array of cones form a meniscus structure, the collimated light of a common field angle converge from adjoining cones to a single point on the confocal contour of the rhabdom layer. Thus the light from all of the cones separate according to field angle and then superpose on the rhabdom surface to produce a single, upright image. Since light from a large number of cones contribute to each field point in the image, the effective sensitivity of a superposition eye is increased relative to an apposition eye. This is why apposition eyes are found primarily on diurnal arthropods, such as butterflies, and superposition eyes are found primarily on nocturnal arthropods, such as moths.

Despite the inherent advantages of the superposition architecture, artificial compound eyes are more commonly derived from the much simpler apposition format. Duparré et al. describe a flat lenslet array artificial compound eye the size and shape of a credit card (see Duparré et al., Applied Optics, August 2004, pp 4303-4310, vol. 43, No. 22). The flat design attribute is beneficial in that it enables the use of flat lenslet arrays, which are readily manufactured in a variety of ways (see for example Fadel et al., U.S. Pat. No. 6,967,779). The flat design also matches well to flat mosaic detector arrays, which are easy to manufacture and readily available. However, the flat design attribute limits the field of view to just 21 degrees.

Another variation of a flat lenslet array system is described by Gurevich et al. in U.S. Pat. No. 7,187,502. This system uses a second flat lenslet array of a different pitch to increase the magnification of the image. The system was invented for imaging "remotely located objects, i.e., objects located behind the focal distance of the assembly". Though the flat lenslet arrays described in these inventions are readily available, a curved lenslet array would enable a larger field of view and allow the optics to be made conformal to its mounting structure.

Lee and Szema describe an artificial apposition array compound eye that closely mimics the design found in nature (see Lee and Szema, Science, November 2005, pp 1148-1150, vol. 310, No. 5751). The lenslet array is convex in shape, and the light from each lenslet is focused onto a convex surface. Unfortunately, the design requires a convex shaped detector array of extremely small size to capture the image.

Another apposition compound eye concept is described by Sweatt and Gill in U.S. Pat. No. 7,286,295. In this concept the lenslets have power on two surfaces and are preferred to be aspheric to correct for optical aberrations. The lenslets are made from polymethyl methacrylate and are optimized for a single wavelength. The lenslets are separated laterally along the array by a spacer baffle that prevents cross-talk between cells. The lenslets focus a series of inverted sub-images onto a dome shaped, coherent fiber optic bundle that is supposed to transport the sub-images onto a flat detector array. However, the fiber optic bundle is not tapered, and so the fiber tips are beveled along the peripheral regions of the dome. The bevels prevent light capture along the axes of the peripheral lenslets and encourage stray light capture from oblique angles. Gaps and overlaps in the sub-images are controlled by the spacing of the lenslets and the curvature of the array. Since the sub-images are each inverted, the composite image must be constructed digitally by post-processing.

An artificial superposition array compound eye is described in U.S. Pat. No. 7,376,314. In this concept two lenslet arrays are hot press molded into a convex, meniscus form. The lenslets are paired to operate as afocal Keplerian telescopes that focus, collimate, and bend the incoming light. The meniscus form enables the collimated light from adjacent lenslets to be directed toward a common point on the convex surface of a fiber optic imaging taper. In this manner all of the lenslets work together to form a single, upright, high intensity image on top of the taper. The taper transfers the upright image to a flat detector array; no digital post-processing is required. The fiber tips of the taper are each cut perpendicular to the fiber axes, so only image light from the correct angles are captured by the fibers. A honeycomb louver baffle is positioned between the lenslets and the taper dome to block ghost images. The diameter of the honeycomb cells sets the effective pupil size of the optics. A typical cell diameter encompasses 100 lenslets out of the 30,000 lenslets in each array, thereby increasing its sensitivity by a factor of 100 over an equivalent apposition eye.

The main shortcoming in the artificial superposition eye is its spatial resolution, which is limited by optical aberrations and the diameter of the collimated beams that overlap to form the image. The beam diameters can be reduced by decreasing the diameter of the lenslets in the array. However, if the lenslets are to be manufactured by hot press molding, then there are practical limits imposed on the minimum lenslet diameter and on the alignment accuracy between the two arrays. Hot press molding tends to shift the lenslets on the outer convex surface toward the array center, and it tends to shift the lenslets on the inner concave surface away from the array center. This causes blurring of the image. Though the afocal optical aberrations can be corrected by introducing more lenslets arrays and different glass types, it is difficult to accomplish this in a superposition architecture, especially with regard to lenslet alignment if the lenslet diameters are very small.

The main shortcoming in the artificial apposition eye is its sensitivity, which is limited by the diameter of the individual lenslets. If the lenslet diameters are increased, then each lenslet must cover multiple field angles, thereby creating sub-images. Since the sub-images are inverted, a coherent image can only be constructed by post-processing; reconstruction cannot be accomplished where the sub-images overlap on the detector array. It is therefore better to design the optics and baffles to leave gaps between the sub-images while generating redundant image features along the edges of adjacent sub-images. It is then possible to crop the redundant regions when the sub-images are spliced together digitally.

The ideal artificial compound eye is a hybrid that combines the sensitivity of the superposition eye with the resolution of the apposition eye. It generates a single, upright image without the need for post-processing. Since hybrid compound eyes are not found in nature, the design architecture requires invention from first principles.

| U.S. PATENT DOCUMENTS | | |
|---|---|---|
| 4,357,088 | Nov. 2, 1982 | Pomerantzeff |
| 4,437,735 | Mar. 20, 1984 | Momiyama |
| 6,449,103 | Sep. 10, 2002 | Charles |
| 6,571,043 | May 27, 2003 | Lowry et al. |
| 6,898,015 | May 24, 2005 | Yoshikawa et al. |
| 6,933,167 | Aug. 23, 2005 | Yamamoto |
| 6,942,959 | Sep. 13, 2005 | Dubin et al. |
| 6,967,779 | Nov. 22, 2005 | Fadel et al. |
| 7,106,529 | Sep. 12, 2006 | Kerr et al. |
| 7,119,962 | Oct. 10, 2006 | Gurevich et al. |
| 7,184,090 | Feb. 27, 2007 | Watanabe et al. |
| 7,187,502 | Mar. 6, 2007 | Gurevich et al. |
| 7,217,573 | May 15, 2007 | Oshida et al. |
| 7,286,295 | Oct. 23, 2007 | Sweatt et al. |
| 7,376,314 | May 20, 2008 | Reininger |

OTHER PUBLICATIONS

Smith, "Modern Optical Engineering", McGraw-Hill, 1990.
Land and Nilsson, "Animal Eyes", Oxford University Press, 2002.
Duparré et al., "Artificial Apposition Compound Eyes Fabricated by Micro-Optics Technology", Applied Optics, August 2004, pp 4333-4310, vol. 43, No. 22.
Lee and Szema, "Inspirations from Biological Optics for Advanced Photonic Systems", Science, November 2005, pp 1148-1150, vol. 310, No. 5751.
Ohara, "Glass Catalog Data", Ohara Corporation, October 2007.

SUMMARY OF THE INVENTION

In accordance with the present invention, there is provided a hybrid multiple aperture array imaging system formed from superposition and apposition compound refractive optics. It combines the high sensitivity attribute of superposition arrays with the high resolution attribute of an apposition array to generate a single, contiguous image. In the superposition section of the optics, a convex shaped array of Keplerian telescope objectives divides and focuses the incoming light into a series of beams that are channeled through the tubes (or hollow light conduits) of a louver baffle. The baffle is terminated by a field stop array that separates the focused light into intermediate sub-images. The size and shape of the sub-images are determined by the size and shape of the field stops. Positioned immediately after the field stops is a convex shaped array of field lenslets that reverses the field angles of the beams. The Keplerian reversal of the beam angles ensures that the final sub-images are upright and orientated properly, so as a composite they form a single, upright image. The superposition effect of the two lenslet arrays works with the field stops to allow the lenslet diameters to be increased without generating the multiple, overlapping and reversed images that would be formed in an apposition array with over sized lenslets. As a consequence, the lenslet diameters of the hybrid can be increased by an order of magnitude over what they would be for either an apposition or superposition array. This increases the throughput of the hybrid array while simplifying manufacturing and alignment.

The high resolution capability is achieved by refocusing the beams with a final apposition array of erector lenslets. Unlike an ordinary apposition array, this one is linked optically to the superposition arrays and field stops to adjoin the focused beams into a single, upright image. The upright image is formed on the convex surface of a fiber optic imaging taper, which transfers the image light by total internal reflection to the flat bottom of the taper. Since the image is formed optically without the need for post-processing, it can be amplified directly by an image intensifier for viewing through an eyepiece, or it can be digitized by a flat detector array and its associated readout electronics.

OBJECTS OF THE INVENTION

It is an object of the invention to provide a system for generating high resolution, wide angle images without distortion.

It is another object of the invention to enable imaging at any depth of field without the need for focus adjustment.

It is another object of the invention to provide an optical imaging system that can be shaped conformally to any convex mounting surface geometry, whether it be spherical, aspherical, or cylindrical.

It is another object of the invention to combine curved superposition and apposition refracting lenslet arrays to create a single, upright, high resolution, high intensity optical image without the need for post-processing.

It is another object of the invention to enable curved, refracting lenslet arrays to be manufactured at low cost by hot press molding.

It is another object of the invention to correct for optical aberrations using positive and negative lenslets manufactured from glasses of different refractive indices and Abbe numbers.

It is another object of the invention to provide a louver baffle with field stops to enable a contiguous, uniform intensity image to be formed without stray light and ghost images.

It is a further object of the invention to enable a curved image to be transformed by a curved fiber optic imaging taper into a flat image for capture by flat detector arrays and image intensifiers.

BRIEF DESCRIPTION OF THE DRAWINGS

A complete understanding of the present invention may be obtained by reference to the accompanying drawings, when considered in conjunction with the subsequent, detailed description, in which:

FIG. 6a is a table listing the optical prescription for a hybrid superposition-apposition array imaging system of the type illustrated in FIG. 1;

FIG. 6b is a schematic cross-sectional diagram depicting the components of the optical prescription listed in FIG. 6a.

For purposes of clarity and brevity, like elements and components will bear the same designations and numbering throughout the Figures.

DETAILED DESCRIPTION OF THE INVENTION

Figure 1:
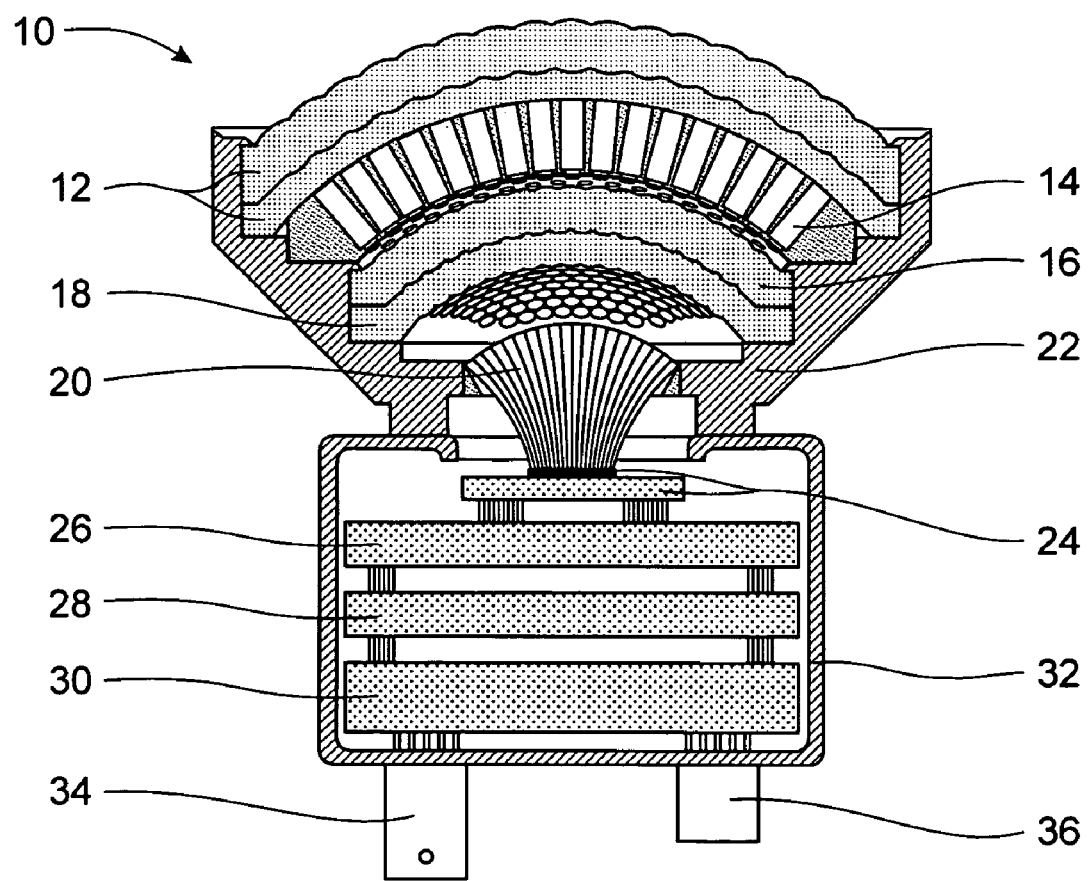
FIG. 1 is a cross-sectional view of a hybrid superposition-apposition array imaging system constructed in accordance with one embodiment of the invention.

Referring now to the drawings, FIG. 1 is a cross-sectional view of a hybrid superposition-apposition array imaging system 10, the preferred embodiment of the hybrid fiber coupled artificial compound eye invention. It includes an objective lenslet superposition array 12, a louver baffle 14, a field lenslet superposition array 16, and an erector lenslet apposition array 18, all held rigidly in alignment by an optical mounting structure 22. Each lenslet array is shaped conformally to a positive meniscus base with curvatures that are concentric. Likewise, the louver baffle 14 is shaped into a positive meniscus form that is concentric to the base curvatures of the lenslet arrays. The convex surface of the baffle conforms exactly to the concave surface of the objective superposition array to which it is in contact.

Attached to the optical mounting structure 22 is the electronics mounting structure 32, which supports a fiber optic imaging taper 20 and a mosaic detector array with readout electronics 24. The large end of the taper conforms to the shape of the lenslet arrays and is concentric to their base curvatures. The small end of the taper is flat and bonds directly onto the flat mosaic detector array. The readout electronics convert the image captured by the detector array into voltages that are amplified by the analog electronics 26 and digitized by the analog to digital converter electronics 28. The digitized image can then be enhanced by the digital processing electronics 30. A video connector 34 is provided to enable the video stream to be cabled to a frame grabber and video monitor for display. A power connector 36 is provided to link the electronics to an external power source.

Figure 2:
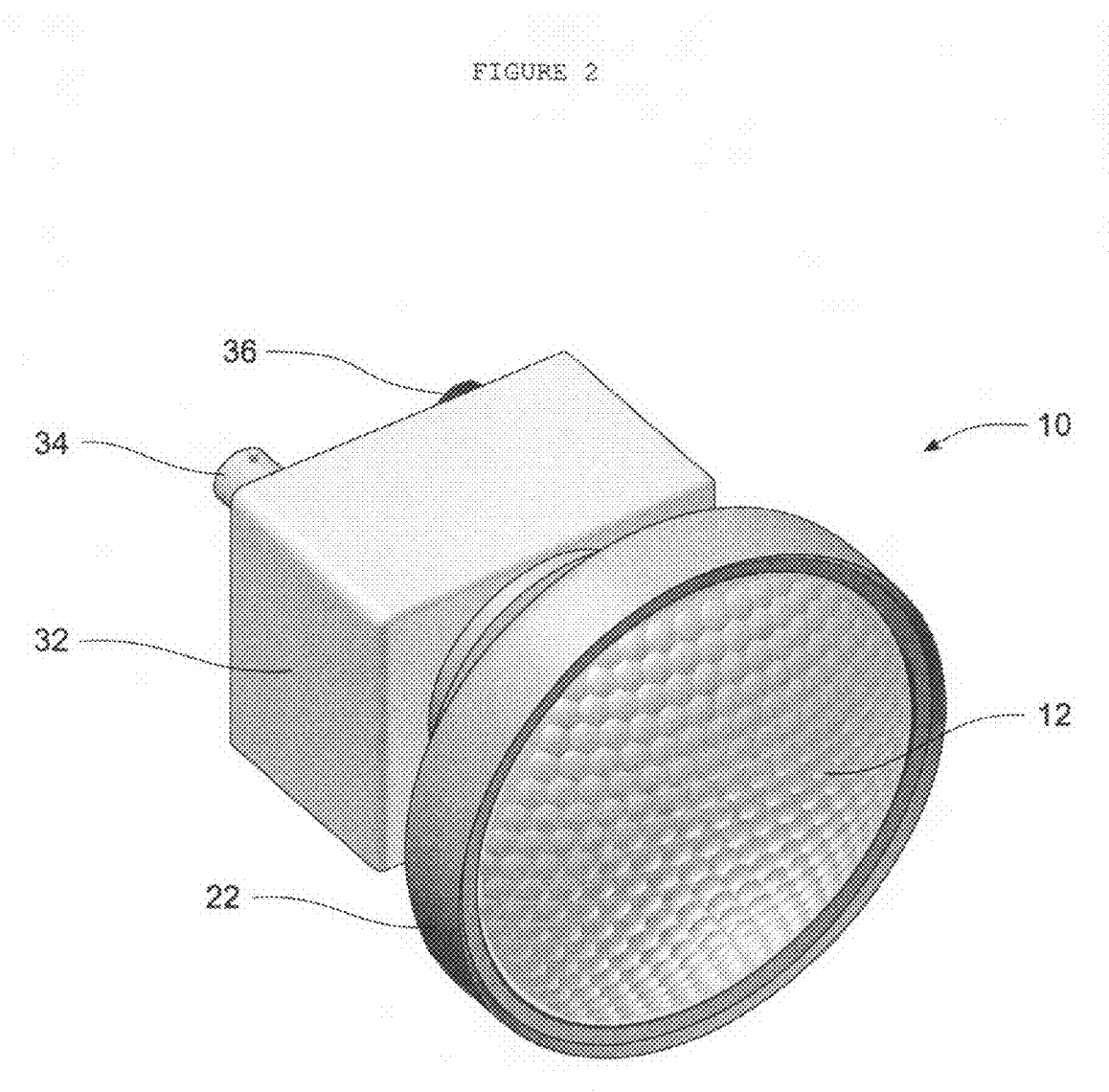
FIG. 2 is an isometric view of a hybrid superposition-apposition array imaging system of the type illustrated in FIG. 1.
Figure 3:
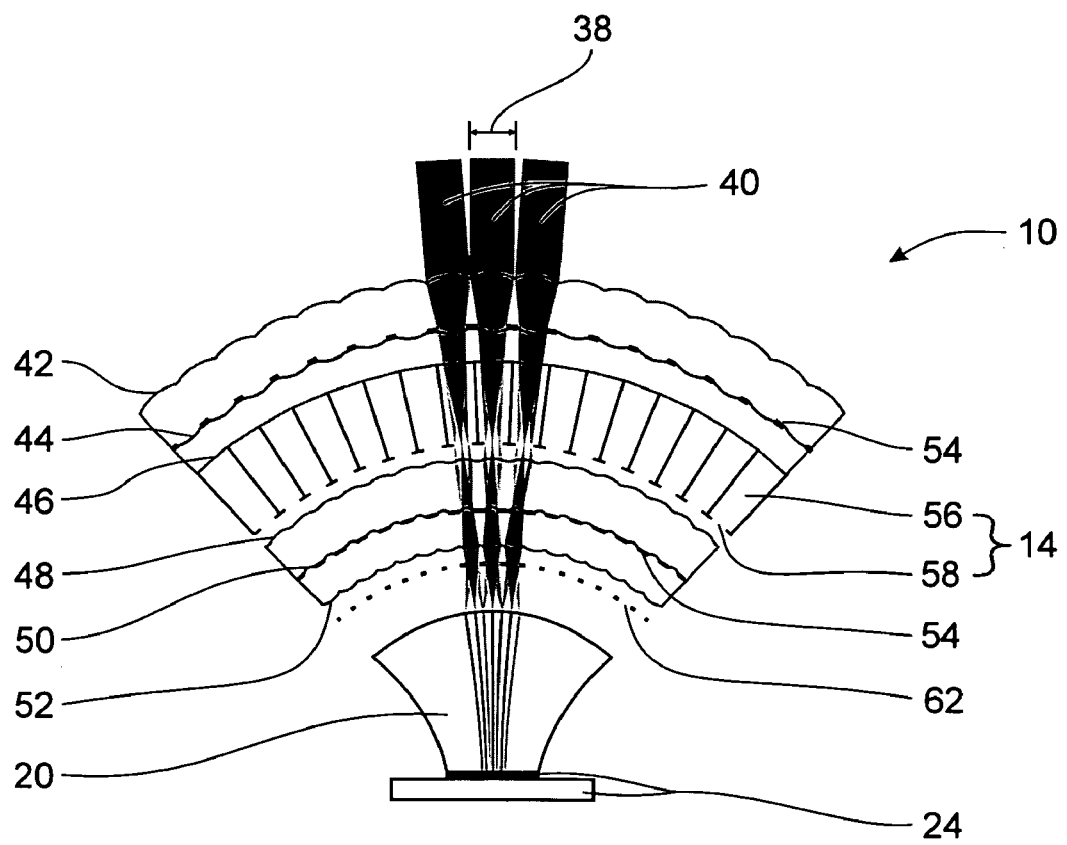
FIG. 3 is a schematic cross-sectional view of a hybrid superposition-apposition array imaging system of the type illustrated in FIG. 1.

FIG. 2 is an isometric view of the hybrid superposition-apposition array imaging system 10 shown in FIG. 1. FIG. 3 is a schematic cross-sectional view of the same system, illustrating how it operates. Starting with the Keplerian telescope section of the superposition array optics, the light beams 40 enter through the first objective lenslet array 42. The lenslets in this array function to focus each beam and define the entrance pupil diameter 38. The beams then pass through the objective achromatic doublet lenslet array 44 where two different glass materials are bonded together. The positive shaped lenslets of the first glass are matched to the negative shaped lenslets of the second glass to correct for chromatic aberrations. The refractive indices and Abbe numbers of the two glasses are selected to produce the same achromatic characteristics of conventional doublets made from crown and flint glasses. An opaque spatial filter array coating 54 is applied to the interstitial spaces surrounding the lenslets to block or vignet off-axis rays. The unblocked rays pass through the spatial filter apertures and exit the second glass at the objective fourth surface 46, which has no lenslets. The beams are then channeled through hollow louver baffle light conduits 56 and exit through the louver baffle field stop array 58.

The light conduits function to eliminate cross-talk between lenslets, thereby eliminating ghost images and stray light.

The field stops limit the angular extent of the beams, and in so doing, define the size of the intermediate sub-images formed at the field stops as well as the conjugate sub-images that are formed on the convex surface of the fiber optic imaging taper 20. If the field stops are circular, then the conjugate sub-images overlap and generate a hexagon shaped intensity pattern. The intensity pattern is an offset bias that can be corrected digitally. The offset correction is accomplished by illuminating the system with a beam of uniform intensity and storing the intensity pattern in the digital processing electronics 30. The stored pattern is then used to baseline the raw video images frame by frame, thereby eliminating the offset bias. If the field stops are hexagon shaped then the intensity offset pattern can be eliminated optically. The detector's pixel-to-pixel response non-uniformities would still require a flat field correction using a source beam of uniform intensity.

Continuing with the operational description, the beams exiting the field stop array enter the field inverting section of the superposition array optics by passing through the first field lenslet array 48. Each lenslet in this array acts to reverse the field angles of the beams. The Keplerian reversal of the beam angles ensures that each of the intermediate sub-images, which are inverted at the field stop apertures, are re-oriented to form a single, upright image in their final composite form. However, before the final composite image can be formed, the beams must pass through the field-erector achromatic doublet lenslet array 50 where two different glass materials are bonded together. Unlike the objective achromatic doublet lenslet array 44, this array has a negative first surface and positive second surface. The doublet functions to correct for chromatic aberrations within the field inverting section of the superposition array optics. A second opaque spatial filter array coating 54 is applied to the interstitial spaces surrounding the doublet lenslets to block or vignet off-axis rays.

The beams that pass through the apertures in the second spatial filter enter into the apposition array optics where they are focused a final time by the second erector lenslet array 52. Like the other lenslet arrays, it is curved into a form that causes the beams to converge. As the converging beams approach the ultimate image surface, they pass through a curved pupil zone. A Lyot stop array 62 can be positioned along the contour of the pupil zone to provide final aberration and stray light control. In an infrared system the Lyot stop can be cooled to reduce thermal background radiation.

When the beams finally adjoin at the fiber optic imaging taper 20, they form a curved, distortion free image on its convex surface. The image light then propagates down the fibers until it reaches the flat mosaic detector array with readout electronics 24.

Figure 4:
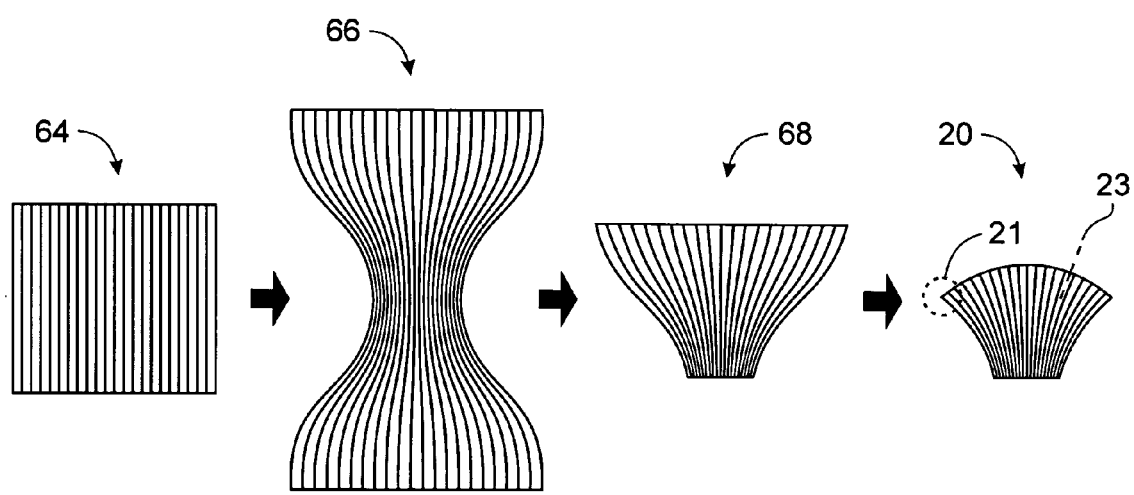
FIG. 4 is a schematic flow diagram showing the process steps to fabricate a convex shaped fiber optic imaging taper of the type included in FIG. 1, with fiber tips cut perpendicular to the fiber optic axes.

FIG. 4 is a schematic flow diagram showing the process steps to fabricate a convex shaped fiber optic imaging taper 20 of the type included in FIG. 3, with fiber tips 21 cut perpendicular to each fiber optic axis 23. The fabrication of the taper begins with an aligned bundle of straight glass fibers that are heated to form a fused imaging fiber conduit 64. The fused conduit is then heated near the center and pulled to form a drawn, double-taper imaging fiber conduit 66 that is cut into two pieces. The ends of each piece are cut again to make a fiber optic imaging taper with flat end surfaces 68. The small end is polished flat; the large end is ground into a dome shape and then polished to form the finished fiber optic imaging taper 20.

Figure 5:
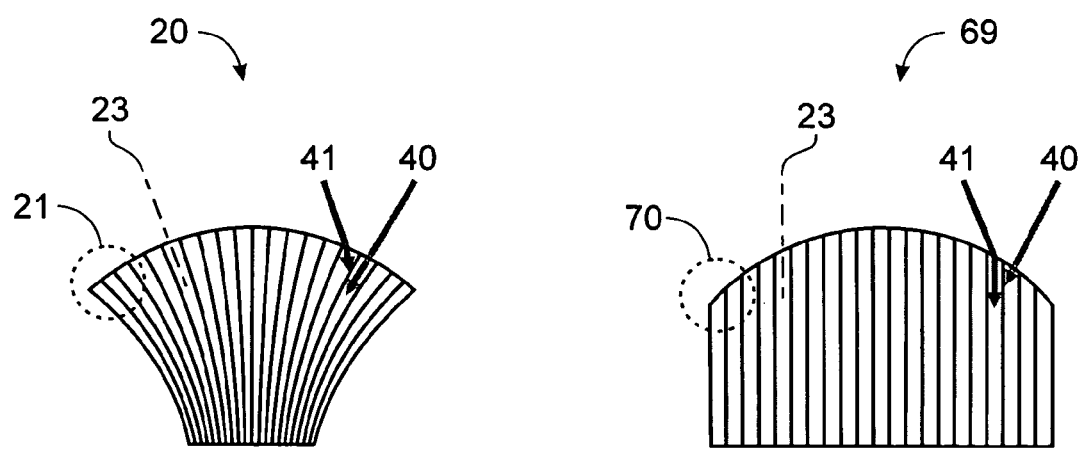
FIG. 5 is a schematic cross-sectional view of a convex shaped fiber optic taper of the type included in FIG. 4, with each fiber tip cut perpendicular to the fiber optic axis to capture image light and block stray light, compared to a convex shaped fiber optic cylinder with beveled fiber tips that capture stray light and block image light.

It is critical that the taper be ground down to the point at which the ends of the fibers point normal to the surface of the dome. The ends of the fibers will then be squared rather than beveled. If the ends are beveled, then image light beams 40 arriving at the proper angle to the dome will be refracted toward the fiber cladding rather than the fiber core. Also, stray light beams 41 arriving at an incorrect angle to the dome will be captured by the fiber core instead of being absorbed by the fiber cladding. Both cases are illustrated in FIG. 5. On the left is shown a schematic cross-sectional view of a convex shaped fiber optic taper of the type included in FIG. 4, with fiber tips 21 cut perpendicular to each fiber optic axis 23 to capture image light beams 40 and block stray light beams 41. On the right is shown a convex shaped fiber optic cylinder 69 with beveled fiber tips 70 that capture stray light beams 41 and block image light beams 40. Only the central fibers of the cylinder can capture image light correctly. The peripheral fibers, which are supposed to view the peripheral field, will instead view the central field and create a ring of ghost images. The image light from the peripheral field will be absorbed in the fiber cladding.

Figure 6B:
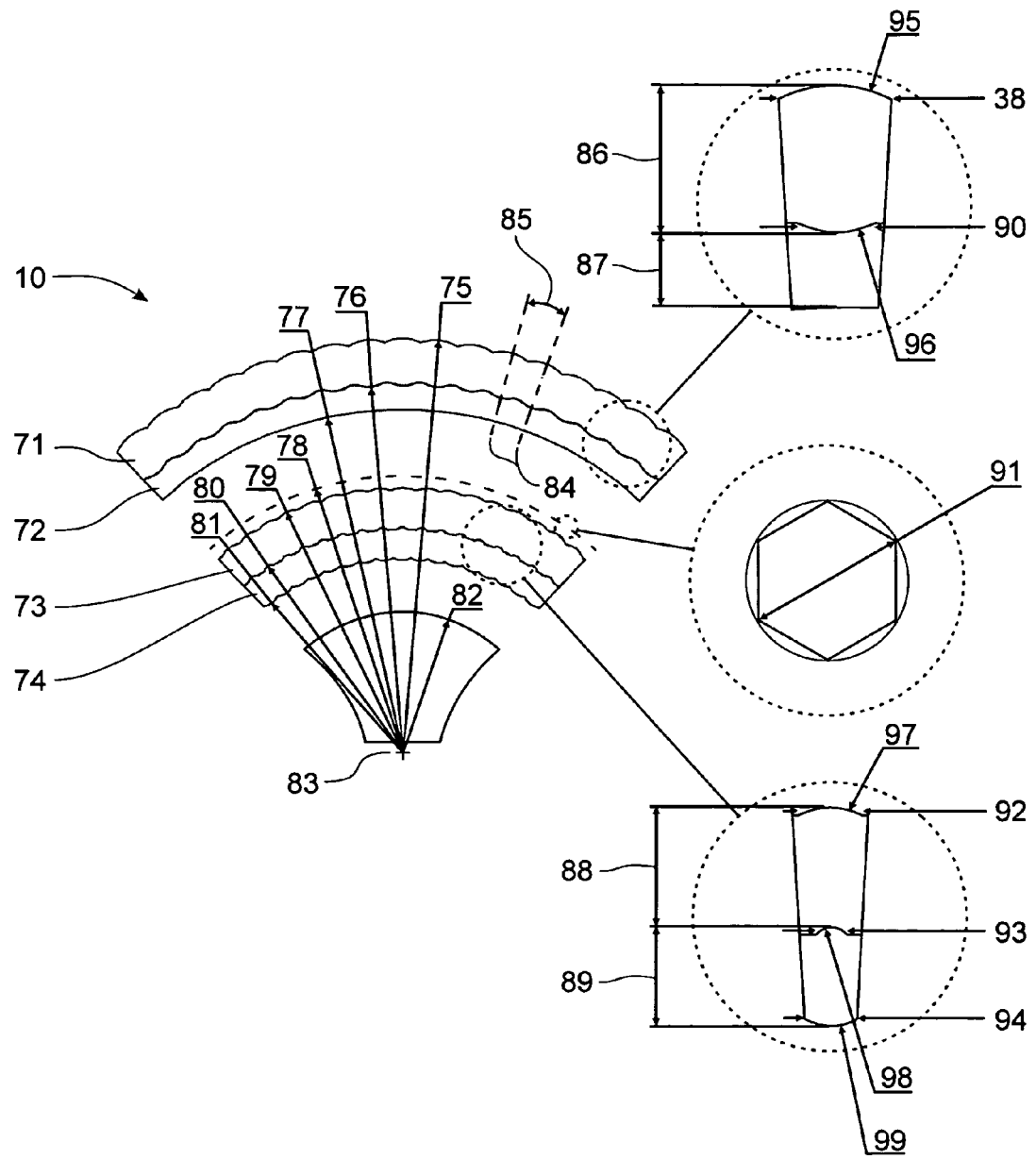

FIG. 6a is a table listing the optical prescription for a hybrid superposition-apposition array imaging system 10 with components defined by the schematic cross-sectional diagram of FIG. 6b. The tabulated prescription defines the shapes of four base lenses and seven lenslet arrays. The base lenses are concentric, so their radii can be defined from a common nodal point at the center of curvature 83. In contradistinction, the lenslet radii have five unique centers of curvature that are colinear along each lenslet optical axis 84. These radial lines are called ommatidial axes in a natural compound eye. There are 265 such axes in the present design.

The lenslet arrays are made conformal to the base shapes by hot press molding glasses with low softening temperatures. The optical prescription incorporates the refractive indices of four such glasses after accounting for drops in their refractive indices induced by the hot press molding process. The glasses were selected to make the design achromatic within the wavelength band of 400-800 nanometers. The resulting imaging resolution is excellent, due in part to the tapering effect of the fiber optics. For example, at a spatial frequency of 75 cycles/mm, the modulation transfer efficiency (MTF) varies from 75-85% across an 85 degree field of view. The light throughput is a very fast F/0.9, also due to the fiber optics.

The optical design can be reconstructed using the data listed in FIG. 6a as well as the data listed in Ohara Corporation's October 2007 Glass Catalog. The first lens material 71 is Ohara glass type L-BAL35. The refractive index of this glass drops by approximately 0.17% from the catalog value after hot press molding. It has the high Abbe number (low relative dispersion) properties of a conventional crown glass. Its convex shape is defined by the first objective array concentric base curvature radius 75; its concave shape is defined by the objective doublet array concentric base curvature radius 76. The second lens material 72 is Ohara glass type L-LAH53, which has the low Abbe number (high relative dispersion) properties of a flint glass. Its refractive index drops by approximately 0.26% after molding. Its convex shape is defined by the objective doublet array concentric base curvature radius 76; its concave shape is defined by the objective fourth surface concentric base curvature radius 77. The third lens material 73 is Ohara glass type L-NBH54, which has the properties of a flint glass. Its refractive index drops by approximately 0.32% after molding. Its convex shape is defined by the first field array concentric base curvature radius 79; its concave shape is defined by the field-erector doublet array concentric base curvature radius 80. The fourth lens material 74 is Ohara glass type L-LAM72, which has the properties of a crown glass. Its refractive index drops by approximately 0.25% after molding. Its convex shape is defined by the field-erector doublet array concentric base curvature radius 80; its concave shape is defined by the second erector array concentric base curvature radius 81.

The louver baffle 14 is not shown in FIG. 6b, but it would fit in the air space that separates the second lens material 72 from the third lens material 73. The baffle structure is made using an inkjet technology that jets black, light absorbing photopolymer material into layers approximately 15-20 microns thick. Each photopolymer layer is cured by ultraviolet light immediately after it is jetted. The process enables the baffle's hollow light conduits to have either a tube or hexagon shaped geometry. The conduits are terminated by field stops that are either circular or hexagon shaped. The field stop array concentric base curvature radius 78 is defined for a concave form. The field stop array aperture diameter 91 indicates the field angle limit of the sub-images isolated by each field stop. Whether the field stop shape is circular or hexagonal, the same aperture dimension applies. Another critical parameter in the optical prescription is the concentric curvature radius of the convex surface on the fiber optic imaging taper 82. This parameter defines the position and curvature of the final composite image that is formed from the sub-images.

Each sub-image is formed from a light beam that is confined to a particular lenslet optical axis 84. The spacing between beam centers is defined by the optical axis separation angle 85. The entrance pupil diameter 38 for each light beam is equal to the diameter of the lenslets on the first objective surface. The focusing power is defined by the first objective lenslet curvature radius 95 and the first lens material thickness 86. After leaving the first lens, the beam passes into the second glass material where it encounters an objective doublet-spatial filter diameter 90 that is smaller than the beam diameter. The smaller spatial filter diameter vignets the beam's marginal rays to reduce off-axis aberrations. Chromatic aberrations are corrected by a negative objective doublet-lenslet curvature radius 96 within the second lens material 72. In optical design parlance, the first lens of the doublet is the positive crown and the second lens is the negative flint. Before leaving the second lens, the beam must travel a distance that is equal to the second lens material thickness 87. The beam then travels in air through one of the hollow louver baffle light conduits 56 and exits through a field stop, which is very near the first field lenslet array 48. The first field lenslet curvature radius 97 is positive to tilt the beam back toward the lenslet optical axis 84. The beam diameter at this surface is approximately equal in size to the first field lenslet diameter 92, so there is no vignetting. The beam then travels a distance that is equal to the third lens material thickness 88. As the beam leaves the third lens material 73 and enters the fourth lens material 74, it encounters a very strong positive lenslet. The power of the doublet formed from the two materials is defined by the field-erector doublet lenslet curvature radius 98, which is very short to correct for chromatic aberrations and Petzval field curvature. The lenslet shape is positive because the beam is diverging, whereas it was negative at the objective achromatic doublet lenslet array 44 when the beam was converging. Thus the beam encounters the negative flint effect within the third lens material 73 before it encounters the positive crown effect within the fourth lens material 74. The beam diameter at the doublet interface is larger than the field-erector doublet-spatial filter diameter 93, which enables the spatial filter coating to vignet the beam and reduce off-axis aberrations. After traveling a distance equal to the fourth lens material thickness 89, the beam encounters the positive focusing lenslets of the second erector array. The second erector lenslet curvature radius 99 is given a negative number because it is followed by air. At this point the beam diameter is roughly equal to the second erector lenslet diameter 94, so there is no vignetting. If vignetting is required, it can be done at the Lyot stop array 62. The function of a Lyot stop is to limit stray light in an optical imaging system and to reduce thermal background radiation in an infrared imaging system.

Figure 7:
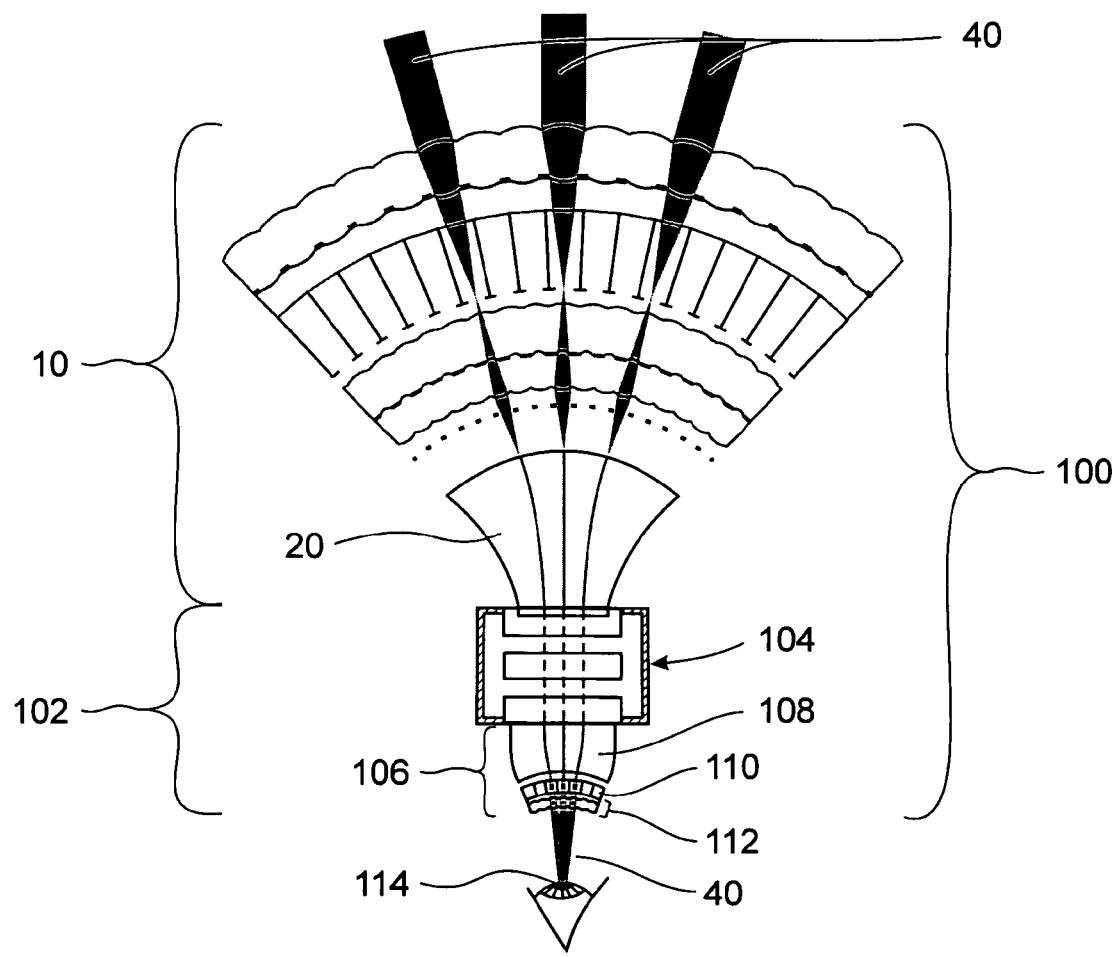
FIG. 7 is a schematic cross-sectional view of a hybrid superposition-apposition array night vision imaging system, an alternative embodiment of the hybrid fiber coupled artificial compound eye invention.

FIG. 7 is a schematic cross-sectional view of the hybrid superposition-apposition array night vision imaging system 100, an alternative embodiment of the hybrid fiber coupled artificial compound eye invention. This embodiment combines the wide angle hybrid superposition-apposition array imaging system 10 with a low light viewing image intensified eyepiece system 102. The low light enhancement is provided by the image intensifier 104 with fiber optic faceplate, photocathode, microchannel plate, and phosphor screen. Light coupling to the intensifier is accomplished by bonding the small end of the fiber optic imaging taper 20 to the fiber optic faceplate that seals the intensifier tube. The faceplate then transfers the image light to the photocathode where the photons are converted into electrons for amplification by the microchannel plate. The electrons are converted back into photons by the phosphor screen. The image on the phosphor screen is upright and can be viewed directly by the eyepiece 106 without the need for a fiber optic inverter. The inverter is replaced by a concave fiber optic imaging taper with fiber tips cut substantially perpendicular to the fiber axes 108. The flat end of the taper is bonded directly to the phosphor screen for efficient light transfer. The concave end of the taper serves to bend the image toward the pupil of the human eye 114, thereby reducing the size and complexity of the final optical elements. The light beams 40 emerging from the taper must first pass through an eyepiece louver baffle 110 to prevent cross talk within the subsequent eyepiece lenslet array 112. The lenslet array serves to collimate the beams and direct them to the pupil for viewing. If the optical design is to be achromatic, then the array should be made from two glasses with negative and positive lenslets. The negative lenslets should be molded from a material similar to flint glass and the positive lenslets should be molded from a material similar to crown glass.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A hybrid fiber coupled artificial compound eye for generating high resolution, wide angle images at any depth of field without distortion and without the need for focus adjustment, comprising:

means for focusing multiple apertures of light into beams that form a convex contour of inverted sub-images;

means for isolating sub-images while eliminating ghost images and stray light, rigidly conformed to said means for focusing multiple apertures of light into beams that form a convex contour of inverted sub-images;

means for reversing the field angles of multiple light beams, optically coupled to said means for isolating sub-images while eliminating ghost images and stray light;

means for refocusing multiple light beams while adjoining them to form an upright image on a convex surface, optically coupled to said means for reversing the field angles of multiple light beams; and means for transforming a convex image into a flat image, optically coupled to said means for refocusing multiple light beams while adjoining them to form an upright image on a convex surface.

2. The hybrid fiber coupled artificial compound eye in accordance with claim 1, wherein said means for focusing multiple apertures of light into beams that form a convex contour of inverted sub-images comprises a conformal, meniscus shaped objective lenslet superposition array, having convex lenslets on the convex surface.

3. The hybrid fiber coupled artificial compound eye in accordance with claim 1, wherein said means for isolating sub-images while eliminating ghost images and stray light comprises a meniscus shaped louver baffle, being made from light absorbing material and having hollow light conduits terminated by field stops.

4. The hybrid fiber coupled artificial compound eye in accordance with claim 1, wherein said means for reversing the field angles of multiple light beams comprises a meniscus shaped field lenslet superposition array, having convex lenslets on the convex surface.

5. The hybrid fiber coupled artificial compound eye in accordance with claim 1, wherein said means for refocusing multiple light beams while adjoining them to form an upright image on a convex surface comprises a meniscus shaped erector lenslet apposition array, having convex lenslets on the concave surface.

6. The hybrid fiber coupled artificial compound eye in accordance with claim 1, wherein said means for transforming a convex image into a flat image comprises a fiber optic imaging taper, being flat shaped at the small end and convex shaped at the large end with fiber tips cut substantially perpendicular to the fiber axes.

7. A hybrid fiber coupled artificial compound eye for generating high resolution, wide angle images at any depth of field without distortion and without the need for focus adjustment, comprising:

a conformal, meniscus shaped objective lenslet superposition array, having convex lenslets on the convex surface, for focusing multiple apertures of light into beams that form a convex contour of inverted sub-images;

a meniscus shaped louver baffle, being made from light absorbing material and having hollow light conduits terminated by field stops, for isolating sub-images while eliminating ghost images and stray light, rigidly conformed to said objective lenslet superposition array;

a meniscus shaped field lenslet superposition array, having convex lenslets on the convex surface, for reversing the field angles of multiple light beams, optically coupled to said louver baffle;

a meniscus shaped erector lenslet apposition array, having convex lenslets on the concave surface, for refocusing multiple light beams while adjoining them to form an upright image on a convex surface, optically coupled to said field lenslet superposition array; and a fiber optic imaging taper, being flat shaped at the small end and convex shaped at the large end with fiber tips cut substantially perpendicular to the fiber axes, for transforming a convex image into a flat image, optically coupled to said erector lenslet apposition array.

8. The hybrid fiber coupled artificial compound eye as recited in claim 7, further comprising:

a mosaic detector array with readout electronics, for capturing and storing digital images, adhesively bonded to said fiber optic imaging taper.

9. The hybrid fiber coupled artificial compound eye as recited in claim 7, further comprising:

an image intensified eyepiece system, for amplifying low intensity light images and making them visible to the human eye, adhesively bonded to said fiber optic imaging taper.

10. The hybrid fiber coupled artificial compound eye as recited in claim 7, wherein said objective lenslet superposition array has characteristics selected from the following group: hot press molded, and having achromatic doublet lenslets on the concave surface and subsequent convex surface.

11. The hybrid fiber coupled artificial compound eye as recited in claim 7, wherein said field lenslet superposition array has characteristics selected from the following group: hot press molded, and having concave lenslets of an achromatic doublet array on the concave surface.

12. The hybrid fiber coupled artificial compound eye as recited in claim 7, wherein said erector lenslet apposition array has characteristics selected from the following group: hot press molded, and having convex lenslets of an achromatic doublet array on the convex surface.

13. The hybrid fiber coupled artificial compound eye as recited in claim 8, wherein said objective lenslet superposition array has characteristics selected from the following group: hot press molded, and having achromatic doublet lenslets on the concave surface and subsequent convex surface.

14. The hybrid fiber coupled artificial compound eye as recited in claim 8, wherein said field lenslet superposition array has characteristics selected from the following group: hot press molded, and having concave lenslets of an achromatic doublet array on the concave surface.

15. The hybrid fiber coupled artificial compound eye as recited in claim 8, wherein said erector lenslet apposition array has characteristics selected from the following group: hot press molded, and having convex lenslets of an achromatic doublet array on the convex surface.

16. The hybrid fiber coupled artificial compound eye as recited in claim 9, wherein said objective lenslet superposition array has characteristics selected from the following group: hot press molded, and having achromatic doublet lenslets on the concave surface and subsequent convex surface.

17. The hybrid fiber coupled artificial compound eye as recited in claim 9, wherein said field lenslet superposition array has characteristics selected from the following group: hot press molded, and having concave lenslets of an achromatic doublet array on the concave surface.

18. The hybrid fiber coupled artificial compound eye as recited in claim 9, wherein said erector lenslet apposition array has characteristics selected from the following group: hot press molded, and having convex lenslets of an achromatic doublet array on the convex surface.

19. The hybrid fiber coupled artificial compound eye as recited in claim 9, wherein said image intensified eyepiece system is a system constructed from an image intensifier, an eyepiece louver baffle, an eyepiece lenslet array, and a concave fiber optic imaging taper with fiber tips cut substantially perpendicular to the fiber axes.

20. A hybrid fiber coupled artificial compound eye for generating high resolution, wide angle images at any depth of field without distortion and without the need for focus adjustment, comprising:

a conformal, meniscus shaped, hot press molded objective lenslet superposition array, having convex lenslets on the convex surface and achromatic doublet lenslets on the concave surface and subsequent convex surface, for focusing multiple apertures of light into beams that form a convex contour of inverted sub-images;

a meniscus shaped louver baffle, being made from light absorbing material and having hollow light conduits terminated by field stops, for isolating sub-images while eliminating ghost images and stray light, rigidly conformed to said objective lenslet superposition array;

a meniscus shaped, hot press molded field lenslet superposition array, having convex lenslets on the convex surface and concave lenslets of an achromatic doublet array on the concave surface, for reversing the field angles of multiple light beams, optically coupled to said louver baffle;

a meniscus shaped, hot press molded erector lenslet apposition array, having convex lenslets on the concave surface and convex lenslets of an achromatic doublet array on the convex surface, for refocusing multiple light beams while adjoining them to form an upright image on a convex surface, optically coupled to said field lenslet superposition array;

a fiber optic imaging taper, being flat shaped at the small end and convex shaped at the large end with fiber tips cut substantially perpendicular to the fiber axes, for transforming a convex image into a flat image, optically coupled to said erector lenslet apposition array;

a mosaic detector array with readout electronics, for capturing and storing digital images, adhesively bonded to said fiber optic imaging taper; and an image intensified eyepiece system, being a system constructed from an image intensifier, an eyepiece louver baffle, an eyepiece lenslet array, and a concave fiber optic imaging taper with fiber tips cut substantially perpendicular to the fiber axes, for amplifying low intensity light images and making them visible to the human eye, adhesively bonded to said fiber optic imaging taper.

* * * * *